(12) United States Patent
Larson

(10) Patent No.: US 9,790,988 B1
(45) Date of Patent: Oct. 17, 2017

(54) SELF-ADJUSTING BUSHING BEARING HAVING A SPRINGY ELEMENT

(71) Applicant: CADventures, Inc., Schaumburg, IL (US)

(72) Inventor: Douglas A. Larson, Ann Arbor, MI (US)

(73) Assignee: CADventures, Inc., Schaumburg, UM (US)

( * ) Notice: Subject to any disclaimer, the term of this patent is extended or adjusted under 35 U.S.C. 154(b) by 22 days.

(21) Appl. No.: 14/961,368

(22) Filed: Dec. 7, 2015

Related U.S. Application Data

(60) Provisional application No. 62/088,796, filed on Dec. 8, 2014.

(51) Int. Cl.
*F16C 23/04* (2006.01)
*F16C 25/04* (2006.01)
*F16C 17/02* (2006.01)

(52) U.S. Cl.
CPC ............. *F16C 25/04* (2013.01); *F16C 17/02* (2013.01)

(58) Field of Classification Search
CPC ..................................... F16C 17/03
See application file for complete search history.

(56) References Cited

U.S. PATENT DOCUMENTS

| 1,331,522 | A |   | 2/1920 | Parson et al. |   |
|---|---|---|---|---|---|
| 1,595,744 | A | * | 8/1926 | Trumpler | F16C 17/024 384/286 |
| 1,852,501 | A |   | 4/1932 | Zipay |   |
| 2,767,034 | A |   | 10/1956 | McCloskey |   |
| 2,953,000 | A |   | 9/1960 | Ressler et al. |   |
| 3,266,855 | A |   | 8/1966 | Cleff |   |
| 3,597,025 | A |   | 8/1971 | Ringel |   |
| 3,744,859 | A |   | 7/1973 | Ringel |   |
| 3,951,475 | A | * | 4/1976 | Okano | F16C 17/03 384/117 |
| 3,985,405 | A | * | 10/1976 | Okano | F16C 17/03 384/117 |
| 4,057,355 | A |   | 11/1977 | Allison |   |
| 4,600,317 | A | * | 7/1986 | Mori | F16C 17/03 384/117 |
| 4,706,971 | A |   | 11/1987 | Schirmer |   |

(Continued)

FOREIGN PATENT DOCUMENTS

| DE | 3244258 | 5/1984 |   |   |
|---|---|---|---|---|
| DE | 102014226807 A1 | * | 6/2016 | ............ F16C 17/024 |

(Continued)

OTHER PUBLICATIONS

U.S. Appl. No. 62/258,695, filed Nov. 23, 2015, entitled "Self-Adjusting Bushing Bearing with Shaft Seal".

*Primary Examiner* — Thomas R. Hannon
(74) *Attorney, Agent, or Firm* — Andrus Intellectual Property Law, LLP

(57) ABSTRACT

Self-adjusting bushing bearings having a springy element. The self-adjusting bushing bearing has a bearing subassembly that is configured to be received in a housing and also has a plurality of bearing segments that together are configured to receive a shaft therein. A springy element biases the plurality of bearing segments radially inwardly towards the shaft. The springy element is mated with at least one bearing segment in the plurality of bearing segments.

13 Claims, 15 Drawing Sheets

(56) References Cited

U.S. PATENT DOCUMENTS

| | | | |
|---|---|---|---|
| 4,743,125 A * | 5/1988 | Dammel | F16C 27/02 |
| | | | 384/117 |
| 4,844,650 A | 7/1989 | Zapushek et al. | |
| 5,017,022 A * | 5/1991 | Ruggles | F16C 17/03 |
| | | | 384/100 |
| 5,564,853 A | 10/1996 | Maughan | |
| 5,714,818 A | 2/1998 | Eakman et al. | |
| 5,913,812 A | 6/1999 | Smith et al. | |
| 6,286,837 B1 | 9/2001 | Humphrey | |
| 6,623,164 B1 * | 9/2003 | Gozdawa | F16C 17/03 |
| | | | 384/117 |
| 7,611,286 B2 * | 11/2009 | Swann | F16C 17/03 |
| | | | 384/119 |
| 8,870,459 B2 | 10/2014 | Danowski | |
| 9,121,448 B2 * | 9/2015 | Delgado Marquez | F01D 25/166 |
| 9,581,169 B2 * | 2/2017 | Klusacek | F04D 29/057 |

FOREIGN PATENT DOCUMENTS

| | | |
|---|---|---|
| EP | 0205800 | 4/1986 |
| GB | 374338 | 6/1932 |
| GB | 391960 | 5/1933 |

\* cited by examiner

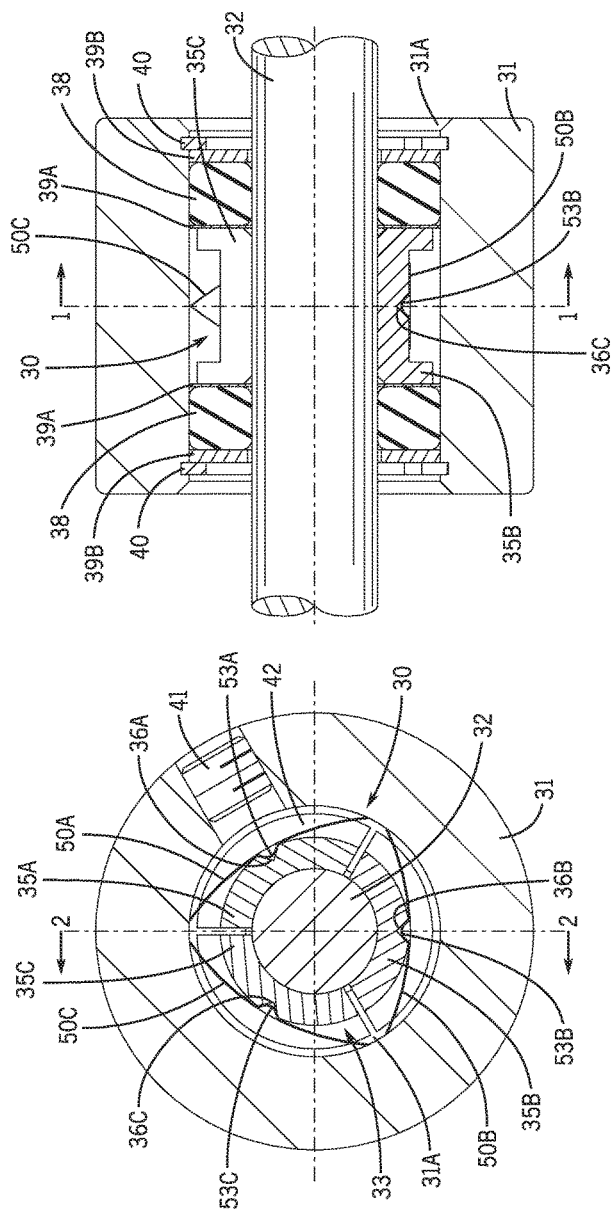

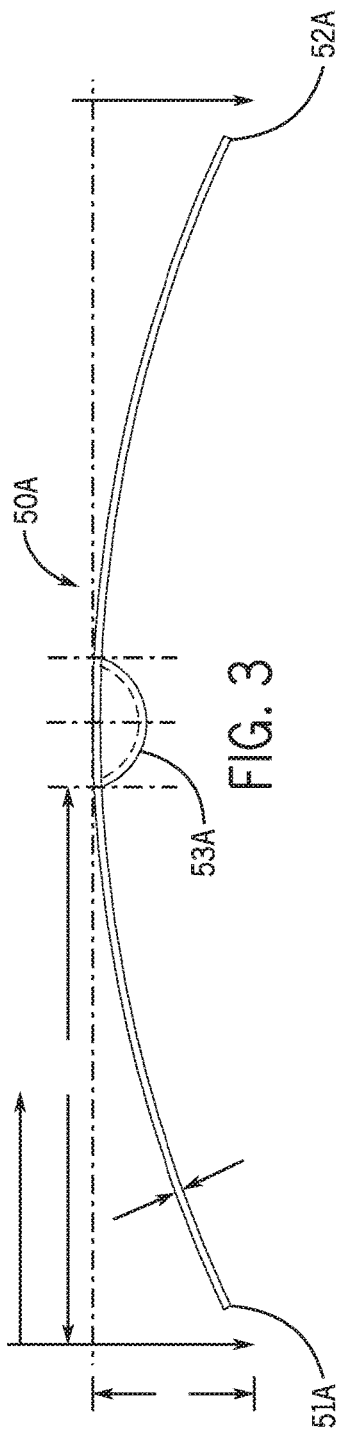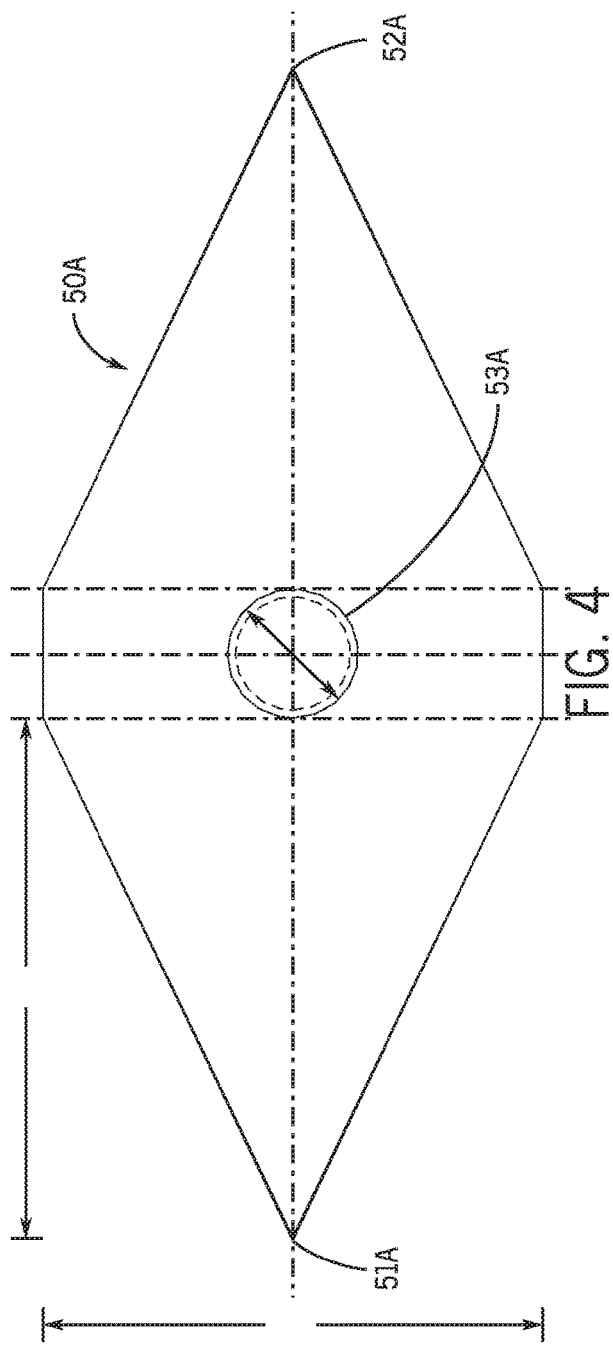

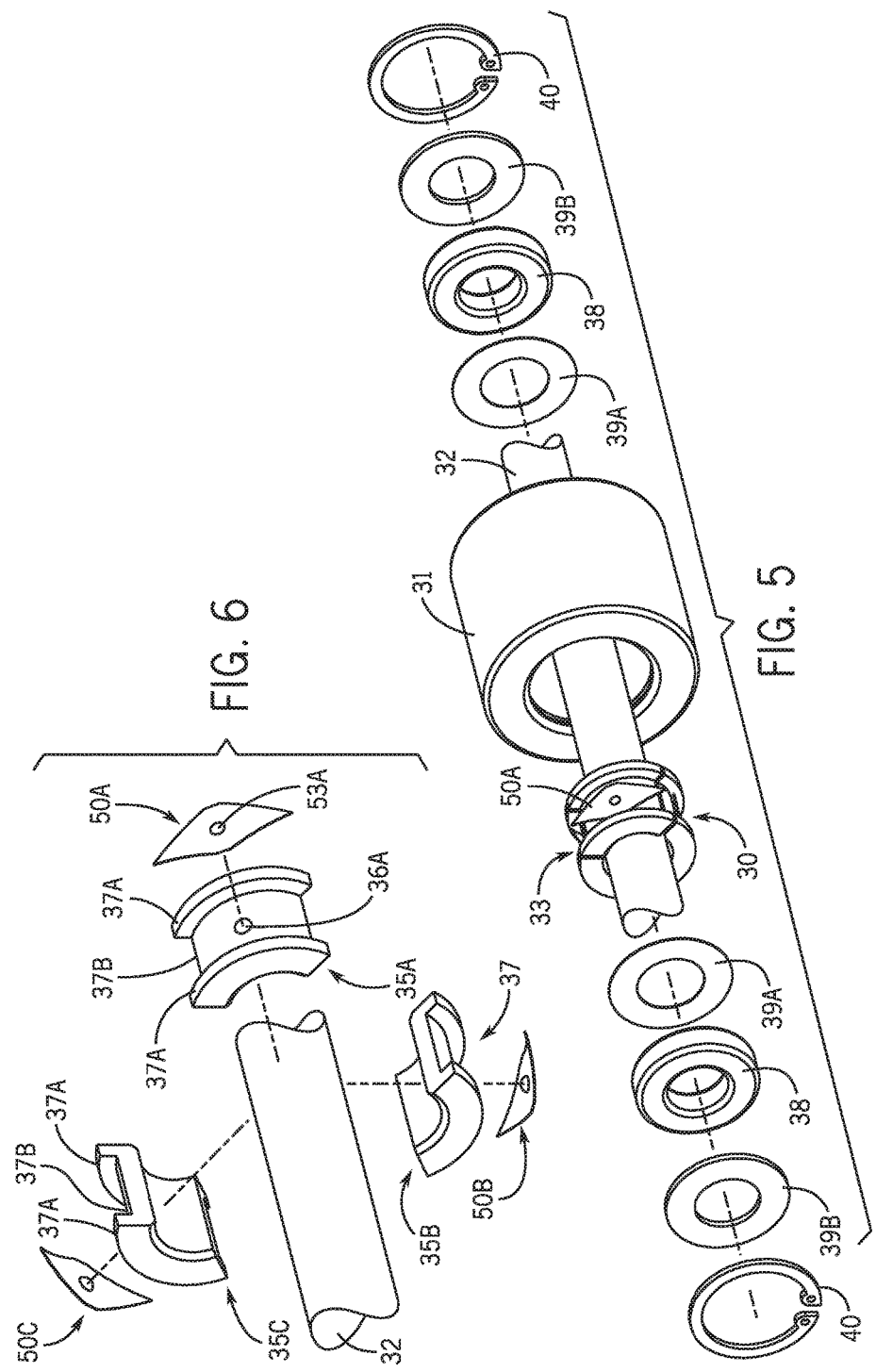

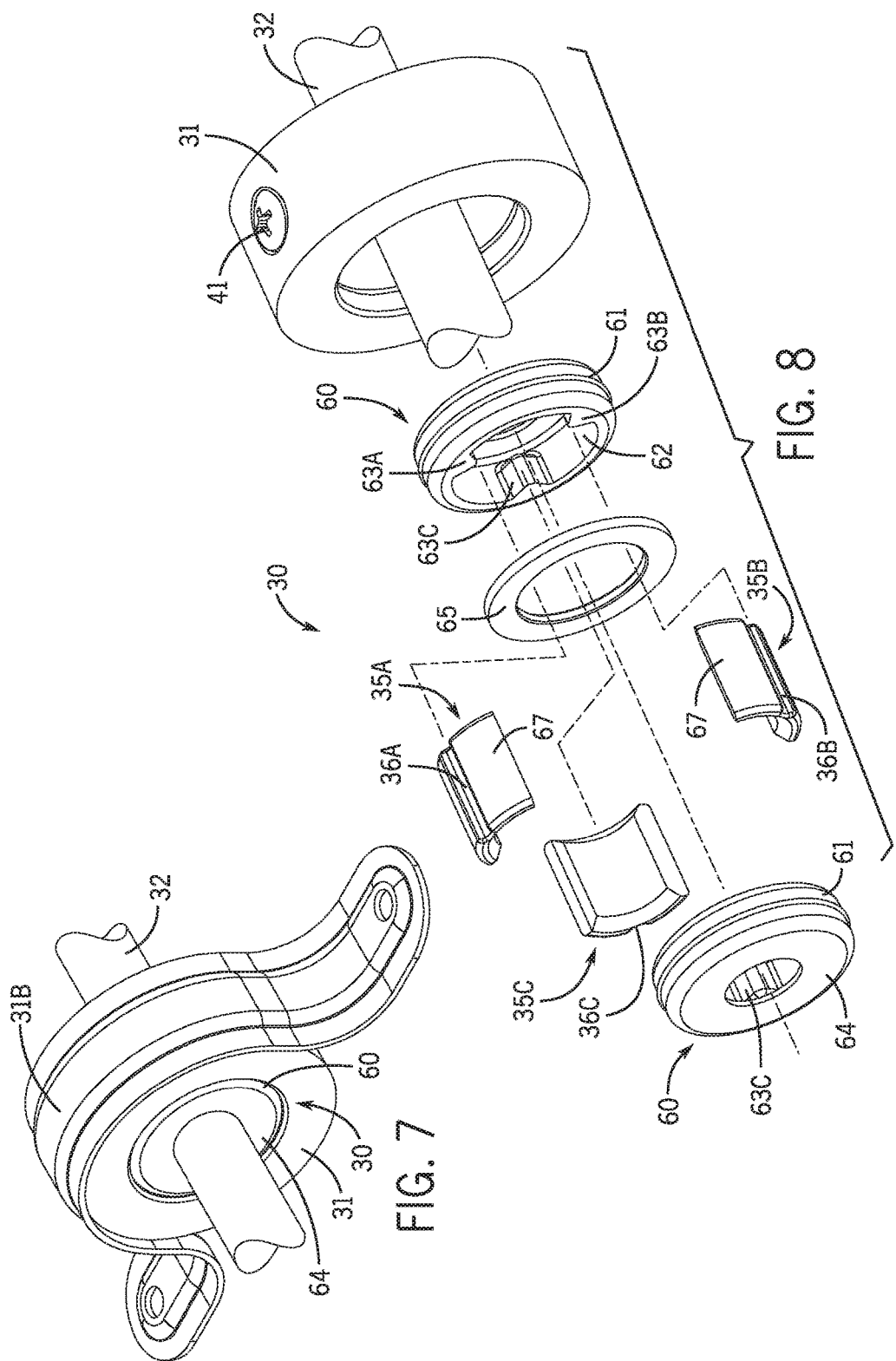

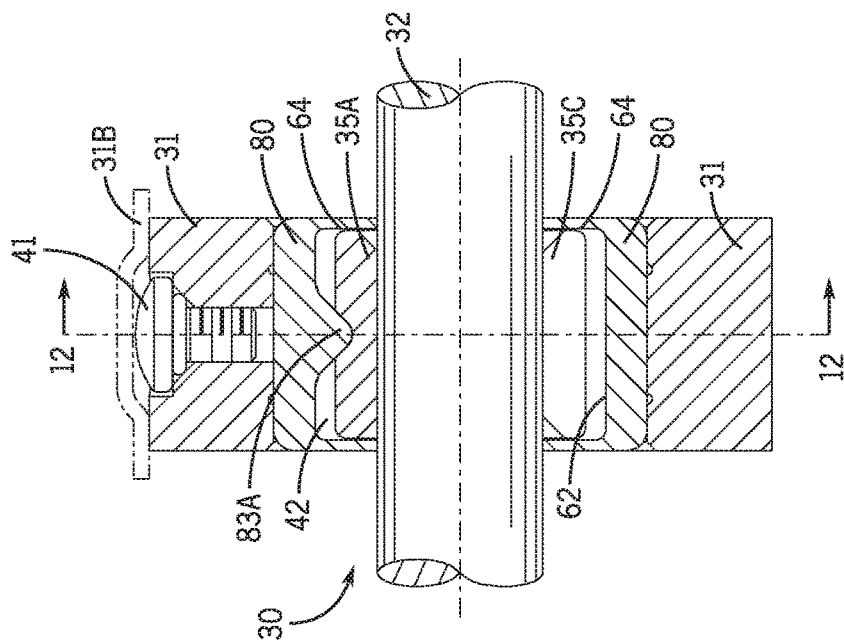
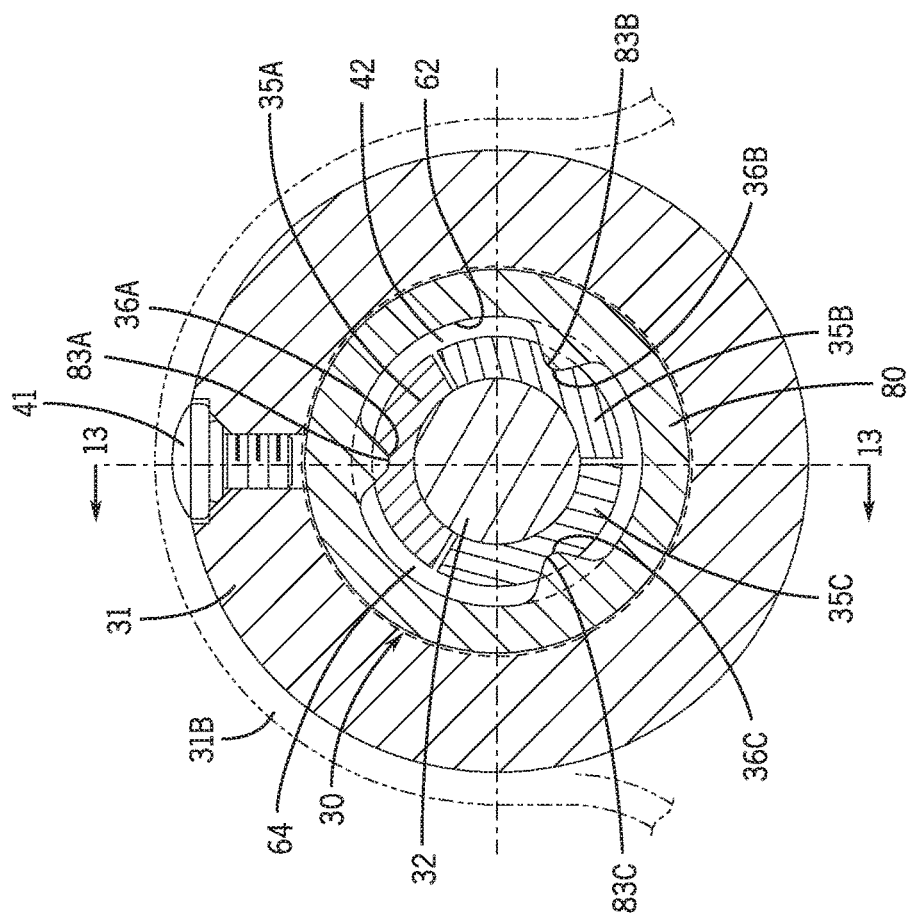

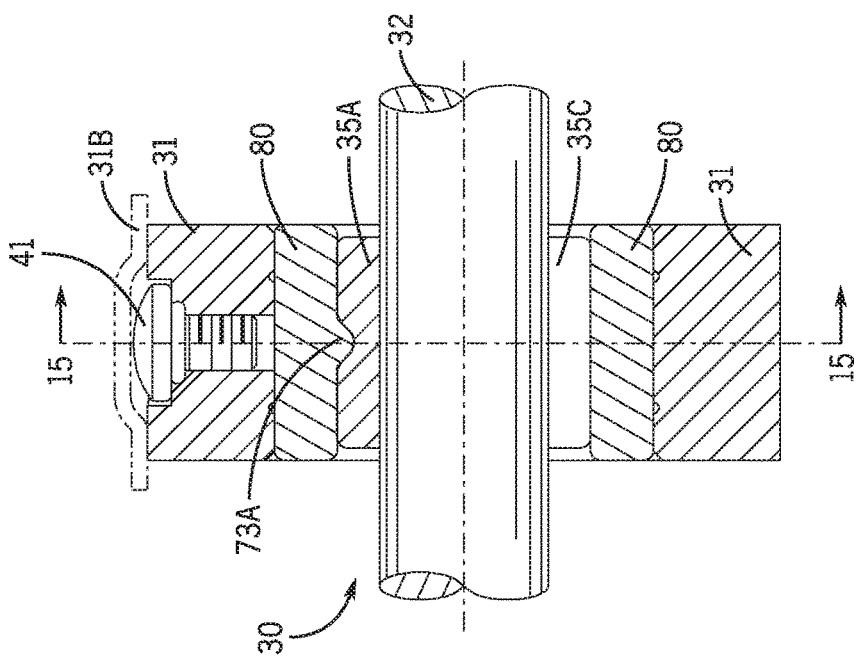
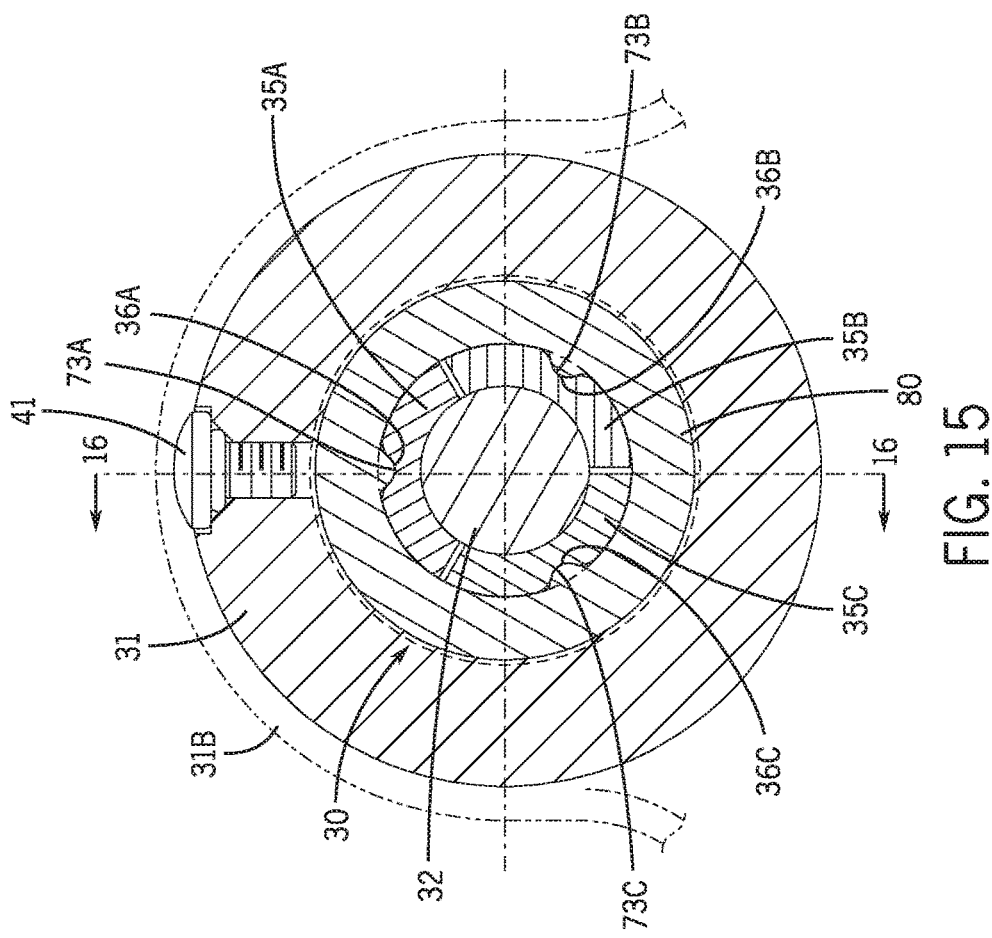

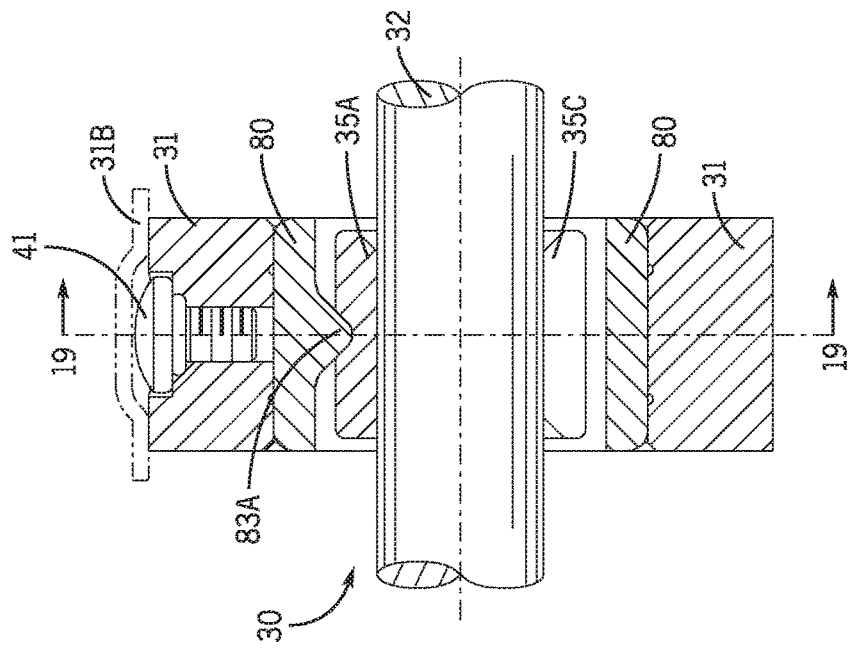
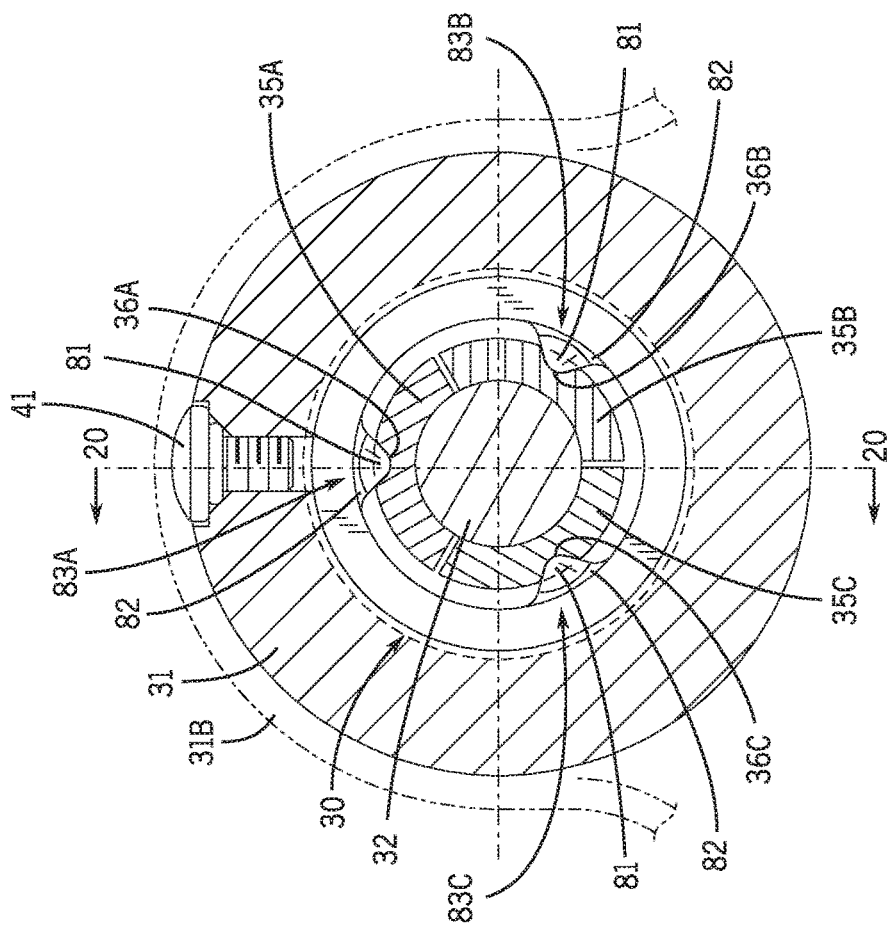
FIG. 20
FIG. 19

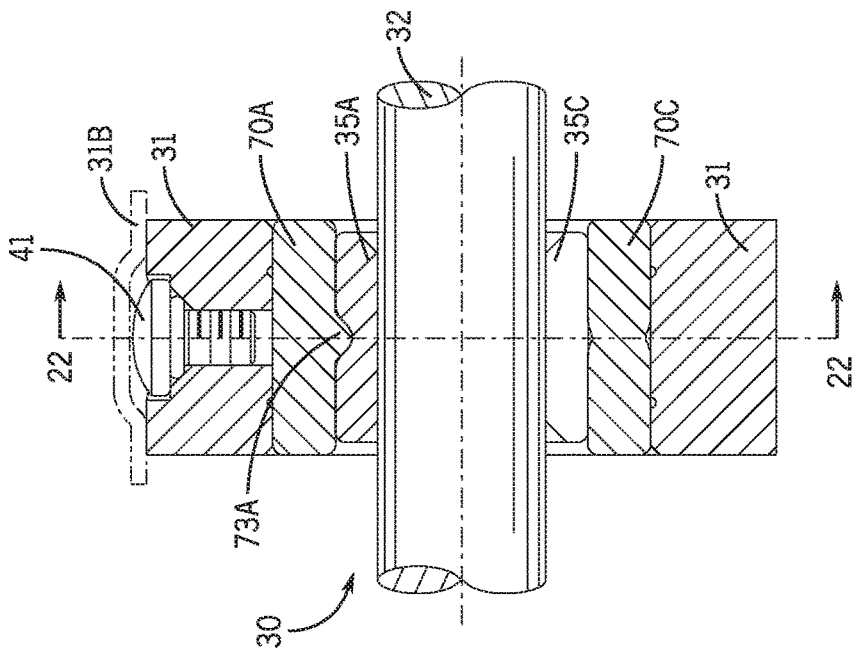
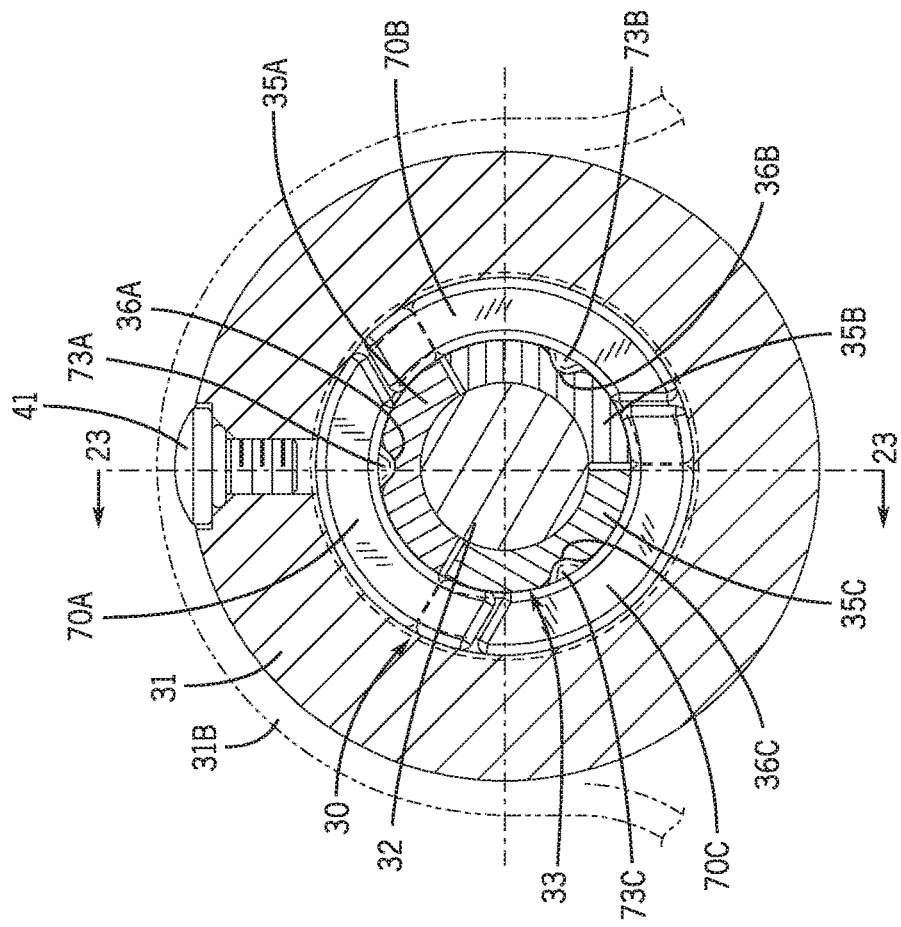
FIG. 23
FIG. 22

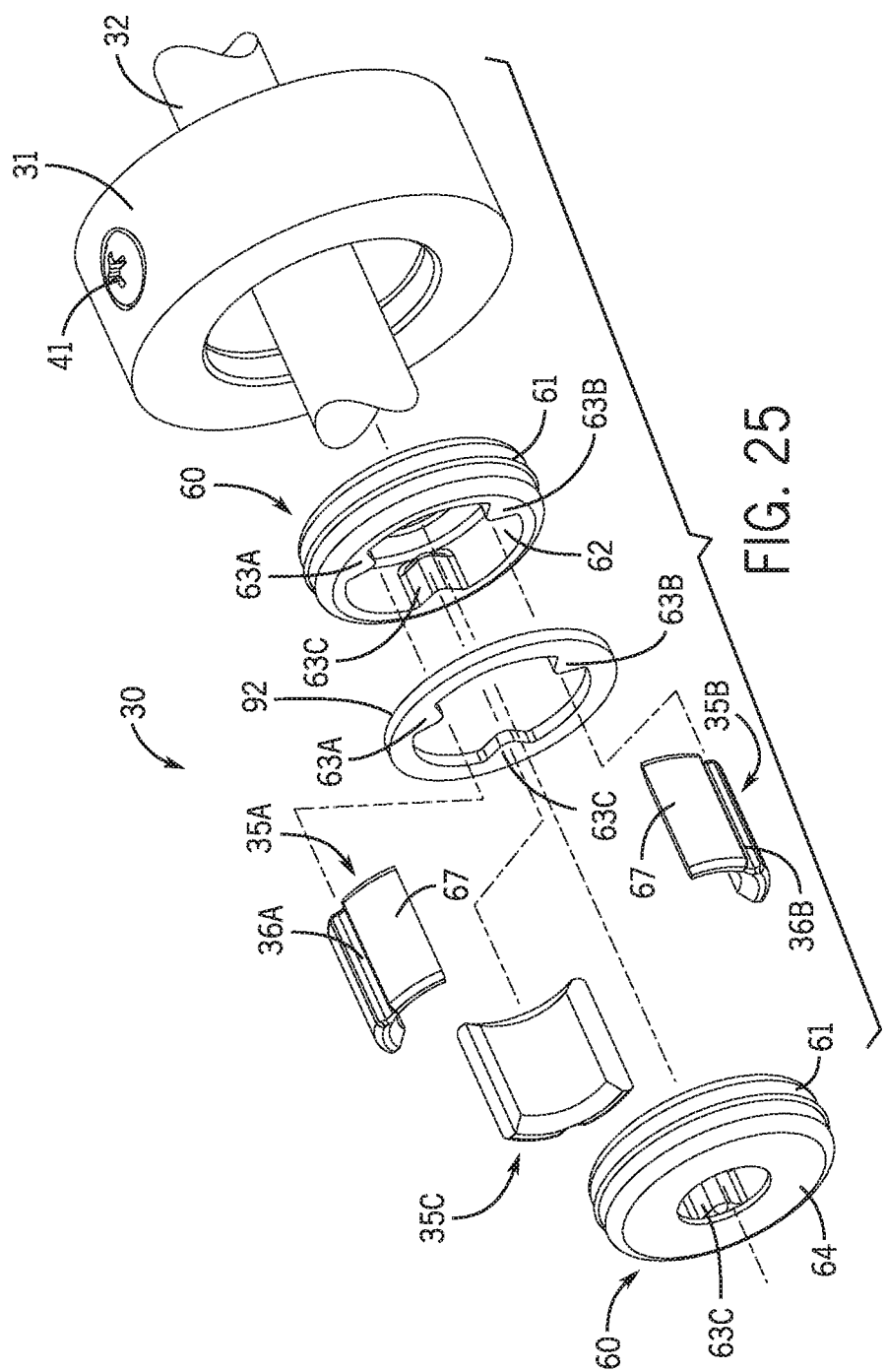

SELF-ADJUSTING BUSHING BEARING HAVING A SPRINGY ELEMENT

CROSS-REFERENCE TO RELATED APPLICATION

This application claims the benefit of and priority to U.S. Provisional Patent Application No. 62/088,796, filed Dec. 8, 2014, which is hereby incorporated by reference in entirety.

FIELD

The present disclosure relates to bushing bearings, and more specifically self-adjusting bushing bearings having one or more spring elements.

BACKGROUND

The following U.S. Patent and Patent Application are hereby incorporated by reference, in entirety.

U.S. Pat. No. 8,870,459 discloses a self-adjusting bushing bearing for engagement with a bearing shaft. A bearing housing is provided. A bearing sub-assembly is received inside of the bearing housing and the bearing sub-assembly is adapted to receive the bearing shaft. The bearing sub-assembly has at least two bearing segments and at least one springy element engaged with the bearing housing which compresses the bearing segments toward one another.

U.S. Provisional Patent Application No. 62/258,695 disclosures a self-adjusting bushing bearing with a shaft seal for engaging a bearing shaft. The self-adjusting bushing bearing has a plurality of bearing segments configured to receive a bearing shaft therein. A springy element engages an outer surface of the plurality of bearing segments and biases the plurality of bearing segments towards the bearing shaft. A shaft seal coupled to the springy element is configured to contact the bearing shaft when the bearing shaft is received in the plurality of bearing segments so as to create an operable seal between the plurality of bearing segments and the bearing shaft.

SUMMARY

This Summary is provided to introduce a selection of concepts that are further described herein below in the Detailed Description. This Summary is not intended to identify key or essential features from the claimed subject matter, nor is it intended to be used as an aid in limiting the scope of the claimed subject matter.

The present disclosure relates to self-adjusting bushing bearings having at least one springy element. The self-adjusting bushing bearing has a bearing subassembly that is configured to be received in a housing and also has a plurality of bearing segments that together are configured to receive a shaft therein. A springy element biases the plurality of bearing segments radially inwardly towards the shaft. In certain examples, the springy element is mated with at least one bearing segment in the plurality of bearing segments.

BRIEF DESCRIPTION OF DRAWINGS

FIG. 1 is cross-section view of an exemplary Self-Adjusting Bushing Bearing with a springy element, shown as three leaf springs.

FIG. 2 is a view of section 2-2 taken in FIG. 1.

FIG. 3 is a side view of an exemplary leaf spring in accordance with the device shown in FIG. 1.

FIG. 4 is a top view of the leaf spring shown in FIG. 3.

FIG. 5 is an exploded view of the device shown in FIG. 1.

FIG. 6 is an exploded close-up view of the device shown in FIG. 5.

FIG. 7 is a perspective view of another exemplary Self-Adjusting Bushing Bearing.

FIG. 8 is an exploded view of the device shown in FIG. 7.

FIG. 12 is a cross-section view of the device shown in FIG. 11.

FIG. 13 is a view of section 13-13 taken in FIG. 13.

FIG. 15 is a cross-section view of the device shown in FIG. 14.

FIG. 16 is a view of section 16-16 taken in FIG. 15.

FIG. 19 is a cross-section view of the device shown in FIG. 17.

FIG. 20 is a view of section 20-20 taken in FIG. 19.

FIG. 22 is a cross-section view of the device shown in FIG. 21.

FIG. 23 is a view of section 23-23 taken in FIG. 22.

FIG. 25 is an exploded perspective view of another exemplary device similar to the device shown in in FIG. 8, but having a second biasing element in addition to the opposing end caps.

DETAILED DESCRIPTION OF THE DRAWINGS

Figure 10:
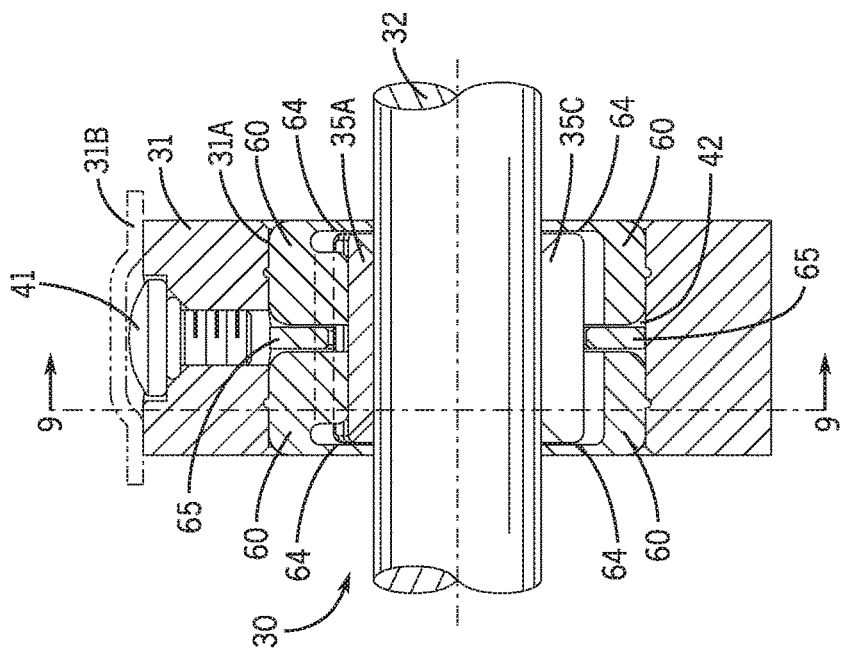
FIG. 10 is a view of section 10-10 taken in FIG. 9.

Through research and experimentation, the present inventors have recognized and endeavored to solve problems associated with bearings. The inventors have recognized that bearings generally require tight machining tolerances to ensure close contact between the bearing and the shaft received therein. The inventors have recognized that this close contact diminishes as the components wear through operation, limiting the life of the bearing.

In a known Kingsbury Journal type bearing, a multi-segment bearing is used to receive the shaft. Each bearing segment is held in a uniform position relative to the other bearing segments. The present inventors have recognized that these bearings also require precision machining and heat treated parts and also remain susceptible to diminished contact between the bearing segments and the shaft as components wear.

In other known bearings, O-ring elastomers are stretched around the outer surfaces of multi-segment bearings to bias the bearing segments towards each other, creating close contact with the shaft received therein. The present inventors have found that the elastomeric materials used may not be able to withstand the desired operating conditions. For example, the bearing application may require withstanding high temperatures, chemical environments that are incompatible with the material, or applications requiring a high or low pH. Likewise, the elastomeric materials used in these bearings may have a limited "shelf life" and can become brittle and crack over time.

Another disadvantage of known bearings using O-ring elastomers is that the elastomer electrically isolates the bearing housing from the shaft. This limits application requiring conductivity between the housing and the shaft and also permits the build-up of static electricity between the isolated components.

The present inventors have also found that in other applications, known bearings cannot accommodate a relatively light preload, a low load versus deflection characteristic, or relatively large travel, such as those occurs with ceiling fans having rotational imbalances. Even in the cases of bearings that incorporate O-ring elastomers to maintain contact between the bearing segment and the shaft, the load versus deflection characteristics may be limited by shape of an O-ring elastomer. Further, the initial preload may not be sufficient for applications that require high initial loads, such as gear trains. In addition, the bearing segments are free to move relative to each other, creating uneven contact with the bearing segments. This movement may reduce the life of the O-ring or bearing segments and may create additional noise during operation.

FIGS. 1 and 2 show an exemplary self-adjusting bushing bearing (SABB) 30 disposed in a housing 31. The SABB 30 has a bearing subassembly 33 and a springy element 50, which in this embodiment includes leaf springs 50A, 50B, 50C. The bearing subassembly 33 is made up of bearing segments 35A, 35B, 35C that together form a cylindrical shape that is configured to receive a shaft 32 therein. Each leaf spring 50A, 50B, 50C is located between the bearing subassembly 33 and the inner periphery 31A of the housing 31.

It should be recognized that while three bearing segments and three leaf springs are shown, other quantities and configurations of bearing segments, leaf springs, or other springy elements may be also used.

FIGS. 3 and 4 show a close-up view of a leaf spring 50A having a first end 51A, a second end 52A opposite of the first end 51A, and a projection 53A located between the first end 51A and the second end 52A. In this embodiment, the leaf spring 50A is an elongated, six-sided shape and the projection 53A is a hemispherical projection. It should be recognized that the material properties and dimension of the leaf springs 50A, 50B, 50C can vary and can be selected based on the particular bearing application. Furthermore, a plurality of leaf springs can be stacked on top of each other to create additional biasing force or change the deflection characteristics.

It should be noted that while FIG. 3 shows a leaf spring 50A in a curved, deflected shape, the leaf spring 50A may have a flat shape before installation into the housing 31. In certain applications with heavier spring forces, the leaf spring 50A may have a curved shape even before installation into the housing 31. Similarly, while FIG. 3 shows the first end 51A and second end 52A of leaf springs 50A being pointed, each could be truncated, allowing the leaf springs 50A, 50B, 50C to engage each other to help to equally space the bearing segments 35A, 35B, 35C apart. Alternatively, the leaf springs 50A, 50B, 50C may be rectangular instead of truncated.

Returning to FIG. 1, the projection 53A, 53B, 53C on each leaf spring 50A, 50B, 50C is received in a recess 36A, 36B, 36C within the bearing segment 35A, 35B, 35C to mate the leaf spring 50A, 50B, 50C with the bearing segment 35A, 35B, 35C. The first end 51A, 51B, 51C and the second end 52A, 52B, 52C of the leaf spring 50A, 50B, 50C are configured to abut against an inner periphery 31A of the housing 31 so that each leaf spring 50A, 50B, 50C is deflected radially inwardly and applies a radially inward force at the projection 53A, 53B, 53C. The deflection of each leaf spring 50A, 50B, 50C provides a constant biasing force on each bearing segment 35A, 35B, 35C radially inwardly towards the shaft 32. This constant biasing force maintains constant, close contact between the bearing segment 35A, 35B, 35C and the shaft 32 during operation. The present inventors have found that constantly biasing the bearing segment 35A, 35B, 35C against the shaft 32 maintains smooth bearing operation despite wear of these components. Similarly, the close contact allows use of a lower viscosity lubricant 42 between the bearing segment 35A, 35B, 35C and the shaft 32.

In certain examples, the first end 51A and second end 52A of each leaf spring 50A, 50B, 50C is configured as a triangular shape to avoid interference with adjacent elements in the SABB 30, which still maintaining contact with the inner periphery 31A of the housing 31.

It should be recognized that while each leaf spring 50A, 50B, 50C can bias one bearing segment 35A, 35B, 35C, a leaf spring 50A, 50B, 50C could bias multiple bearing segments 35A, 35B, 35C. Alternatively, more than one leaf spring 50A, 50B, 50C may bias one bearing segment 35A, 35B, 35C.

FIG. 5 shows a packing seal retainer 39A located next to the bearing subassembly 33 within the housing 31, followed by a packing seal 38, seal retainer 39B, and a retaining ring 40 to retain these structures within the housing 31. Depending on the particular application, the packing seal retainer 39A, the packing seal 38, the seal retainer 39B, and the retaining ring 40 may be disposed on one or both sides of the bearing subassembly 33. Similarly, FIG. 1 discloses a fill plug 41 that permits a lubricant 42 (not shown) to be added inside the SABB 30, as disclosed in U.S. Provisional Patent Application No. 62/258,695.

FIG. 6 further shows each bearing segment 35A, 35B, 35C has a radially outer channel 37 that has opposing sidewalls 37A and a bottom wall 37B. A recess 36A (36B and 36C not shown) is formed in each bottom wall 37B. In this embodiment, each leaf spring 50A, 50B, 50C is disposed within a radially outer channel 37 and is configured to abut the opposing sidewalls 37A and bottom wall 37B. The radial outer channel 37 prevents interference between the leaf spring 50A, 50B, 50C and elements that are adjacent to the bearing subassembly 33, such as a packing seal retainer 39A or a packing seal. In certain examples, opposing sidewalls 37A of the radial outer channel 37 prevent the leaf spring 50A, 50B, 50C from rotating about the projection 53A, 53B, 53C.

FIGS. 7-23 show alternate exemplary SABB 30 embodiments wherein the springy element 50 is a cylindrical body, which in the embodiment shown in FIGS. 7-10 is made up by opposing end caps 60.

Figure 9:
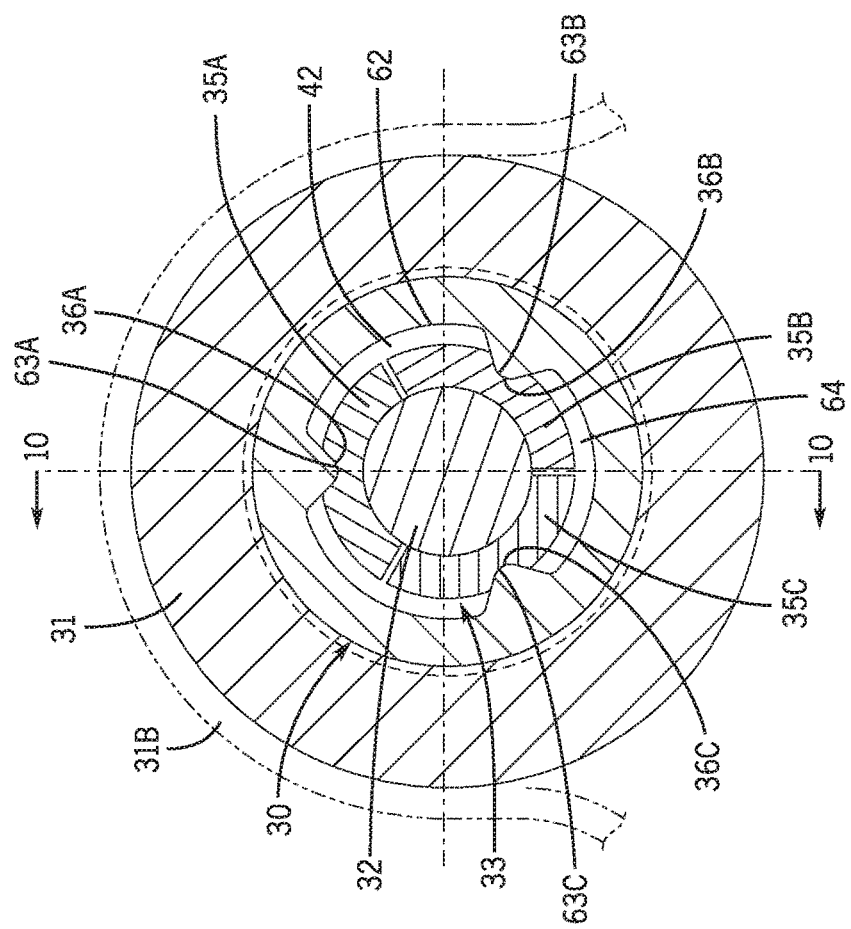
FIG. 9 is a cross-section view of the device shown in FIG. 7.

In the exemplary SABB 30 shown in FIGS. 7-10, the opposing end caps 60 have an outer radial surface 61 and an inner radial surface 62. As shown in FIG. 9, each of the opposing end caps 60 has a projection 63A, 63B, 63C that is triangular prism shaped and axially extends along the inner radial surface 62. FIG. 8 shows that each projection 63A, 63B, 63C mates with a recess 36A, 36B, 36C that axially extends within the outer surface 67 of each bearing segment 35A, 35B, 35C. The opposing end caps 60 apply a radially inwardly force at each projection 63A, 63B, 63C that biases a bearing segment 35A, 35B, 35C radially inwardly towards the shaft 32. The outer radial surface 61 of each of the opposing end caps 60 is configured to abut against the inner periphery 31A of the housing 31, preventing rotation of the SABB 30 within the housing 31.

In certain embodiments, each projection 63A, 63B, 63C is equally spaced apart from the others about the inner radial surface 62 so that the mating between each projection 63A, 63B, 63C and each recess 36A, 36B, 36C maintains equal spacing between each bearing segment 35A, 35B, 35C, best shown in FIG. 9. This configuration also concurrently biases each bearing segment 35A, 35B, 35C towards the shaft 32 as previously discussed.

In certain embodiments, each projection 63A, 63B, 63C separates the inner radial surface 62 from a bearing segment 35A, 35B, 35C, best shown in FIG. 9. In certain embodiments, the space between the inner periphery 31A of the housing 31 and each bearing segment 35A, 35B, 35C is filled a lubricant 42 via fill plug 41, or with a gas, such as air. It should be recognized that the springy element 50, such as opposing end caps 60, may also be hollow or of a foam structure and filled with a gas.

FIG. 8 further shows the opposing end caps 60 each having an end wall 64 radially extending from the inner radial surfaces 62 towards the shaft 32. As seen in FIG. 10, this end wall 64 may be a shaft seal, as disclosed in Provisional U.S. Patent Application No. 62/258,695. By also configuring the outer radial surface 61 of the opposing end cap 60 to abut the inner periphery 31A of the housing 31, an operable seal is created between the shaft 32 and the housing 31. This allows a lubricant 42 to be added within the SABB 30 via the fill plug 41 to maintain constant lubrication between the bearing segment 35A, 35B, 35C and the shaft during operation.

FIGS. 8 and 10 further show that one advantage of using opposing end caps 60 as the springy element is the ability to dispose a radial stop 65 surrounding the bearing subassembly 33 between the opposing end caps 60. The radial stop 65 limits the radial displacement of the shaft 32 relative to the housing 31 by dimensioning the radial stop 65 to abut the inner periphery 31A at a specified deflection. This enables additional applications for the SABB 30 where large radial displacement occurs.

In other embodiments, the radial stop 65 shown in FIG. 8 may have a projection (not shown) to mate with the recess 36A, 36B, 36C in a bearing segment 35A, 35B, 35C in the same manner as opposing end caps 60. By configuring each projection to be equally spaced apart from the others, each projection mating with each recess 36A, 36B, 36C maintains equal spacing between each bearing segment 35A, 35B, 35C. This configuration may be in addition to, or in place of the projections 63A, 63B, 63C in the opposing end caps 60.

Figure 11:
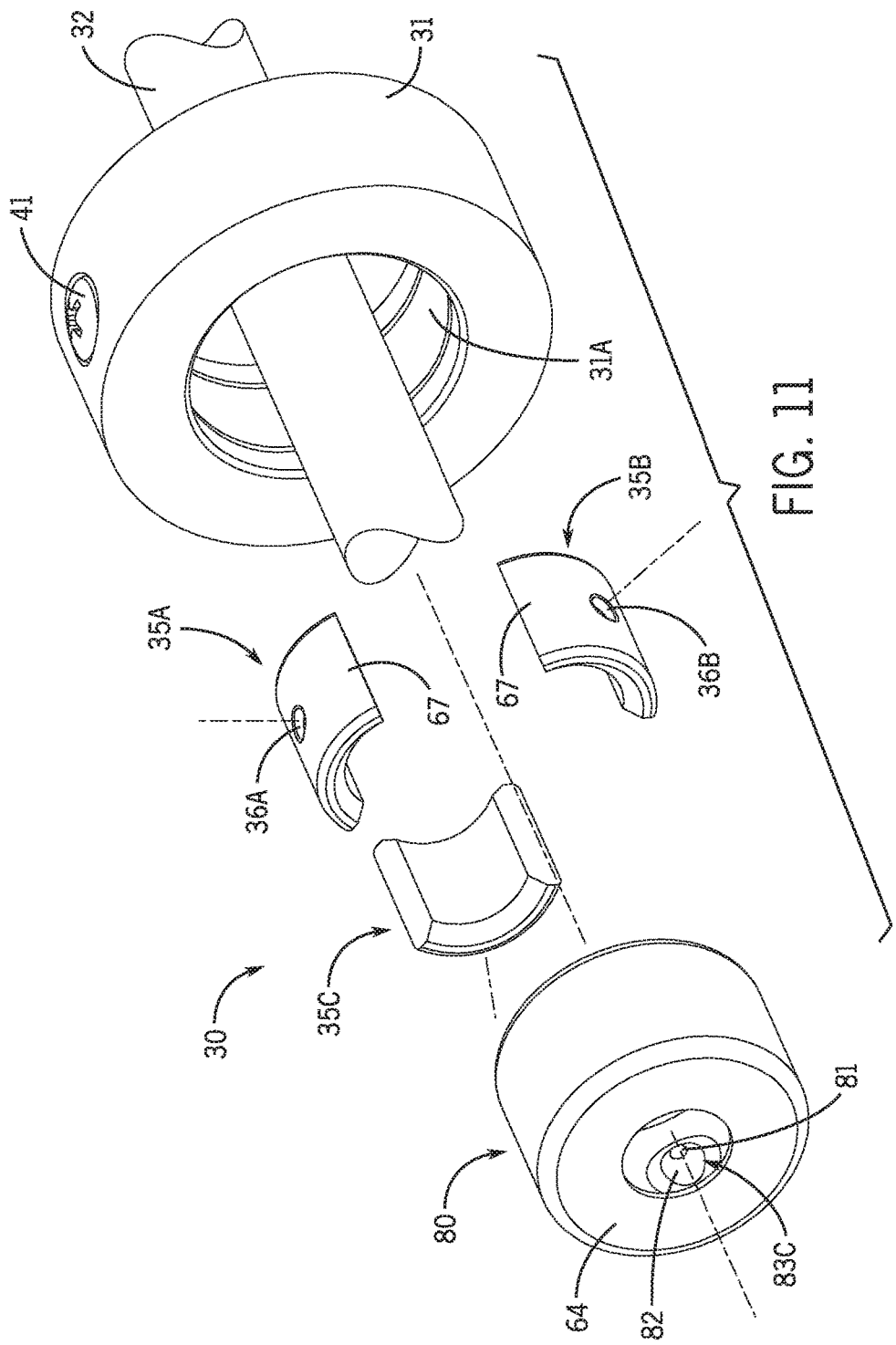
FIG. 11 is an exploded perspective view of another exemplary Self-Adjusting Bushing Bearing.

FIGS. 11-13 show another exemplary SABB 30 wherein the springy element 50 is a cylindrical body 80. In this example, the cylindrical body 80 has an end wall 64 radially extending inwardly from the inner radial surface 62 on each end. FIG. 11 shows a projection 83C having a hemispherical top 81 on top of a frustoconical base 82. The hemispherical top 81 of the projection 83C mates with the recess 36C (not shown) in the bearing segment 35C and the frustoconical base 82 provides separation between the inner radial surface 62 from the outer surface 67 (not shown) of the bearing segment 35C. As stated above, this separation may be filled with a lubricant 42 or a gas, depending on the bearing application.

Alternatively, FIGS. 17-20 show the cylindrical body 80 without an end wall on either side, but wherein each projection 83A, 83B, 83C still separates the inner radial surface 62 from a bearing segment 35A, 35B, 35C. It should be recognized that other shapes or configurations could be used to separate the inner radial surface 62 from the bearing segment 35A, 35B, 35C.

Figure 14:
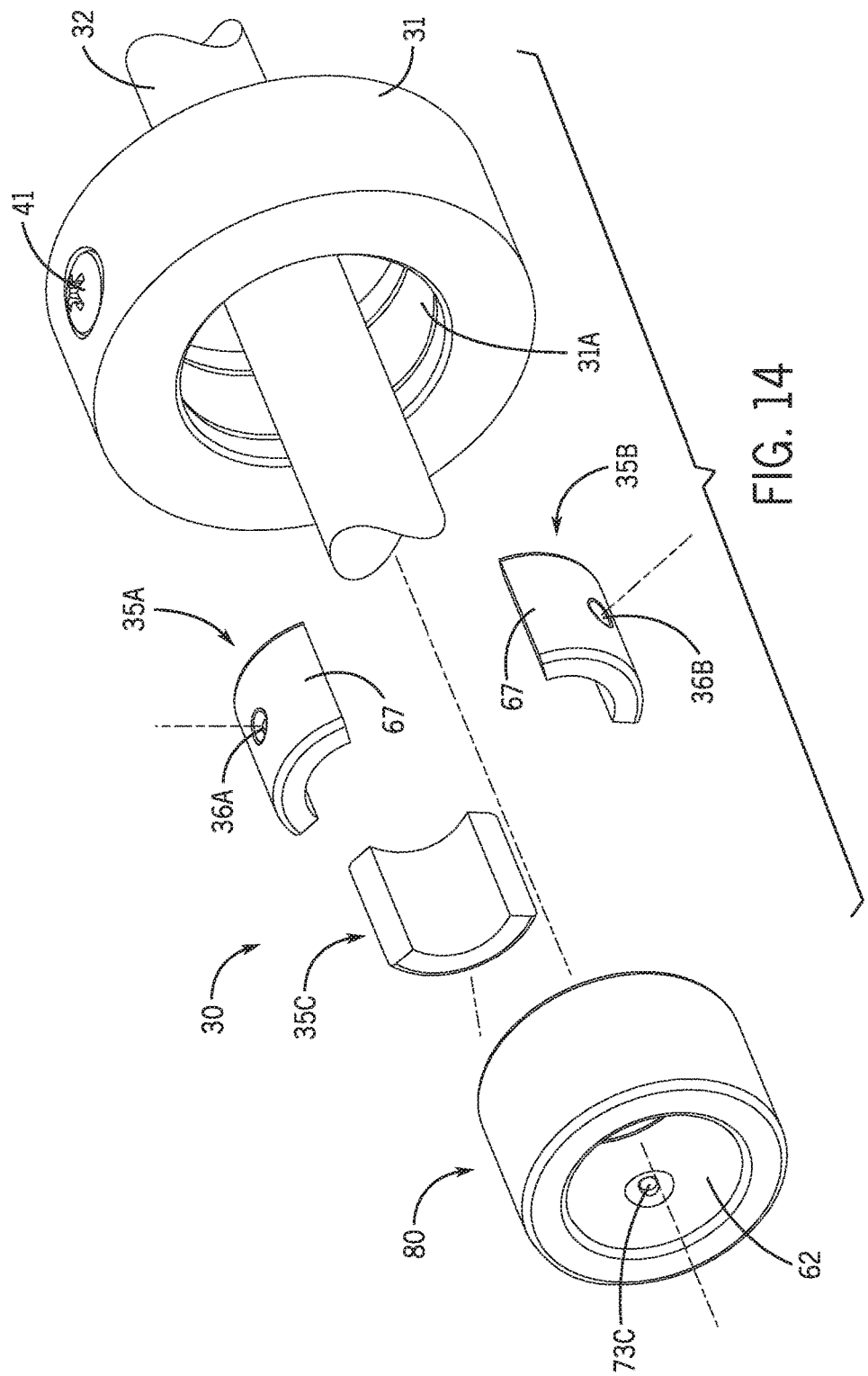
FIG. 14 is an exploded perspective view of another exemplary device similar to the device shown in FIG. 11, but having no shaft seals on the ends.
Figure 18:
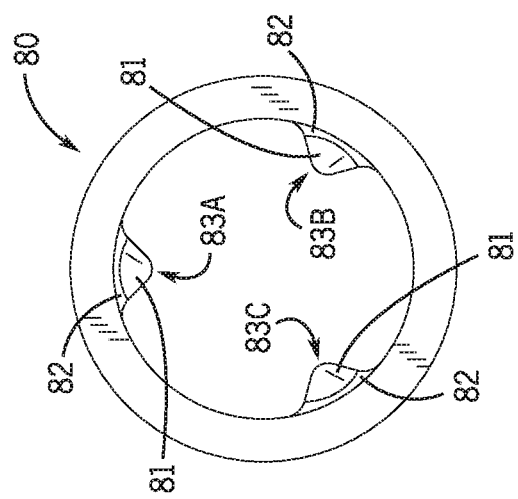
FIG. 18 is a cross-sectional view of the biasing element from the device shown in FIG. 17.
Figure 17:
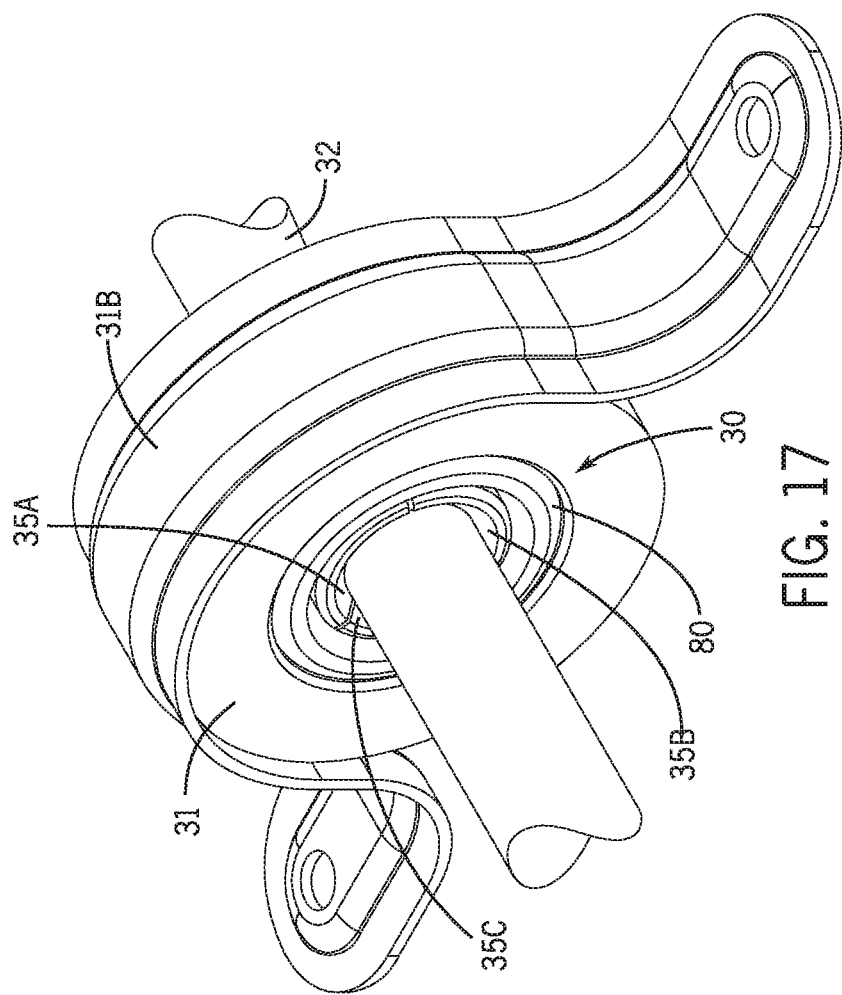
FIG. 17 is a perspective view of another exemplary Self-Adjusting Bushing Bearing similar to the device shown in FIG. 14, but having a space between the annular ring of the biasing element and the bearing segments.

FIGS. 14-16 show the cylindrical body 80 without an end wall on either side, but now configuring each projection 73A, 73B, 73C so that the inner radial surface 62 is not separated from the outer surface 67 of each bearing segment 35A, 35B, 35C. It should be recognized that the device shown in FIG. 14-16 could also have an end wall 64 on either or both ends of the cylindrical body 80.

Figure 21:
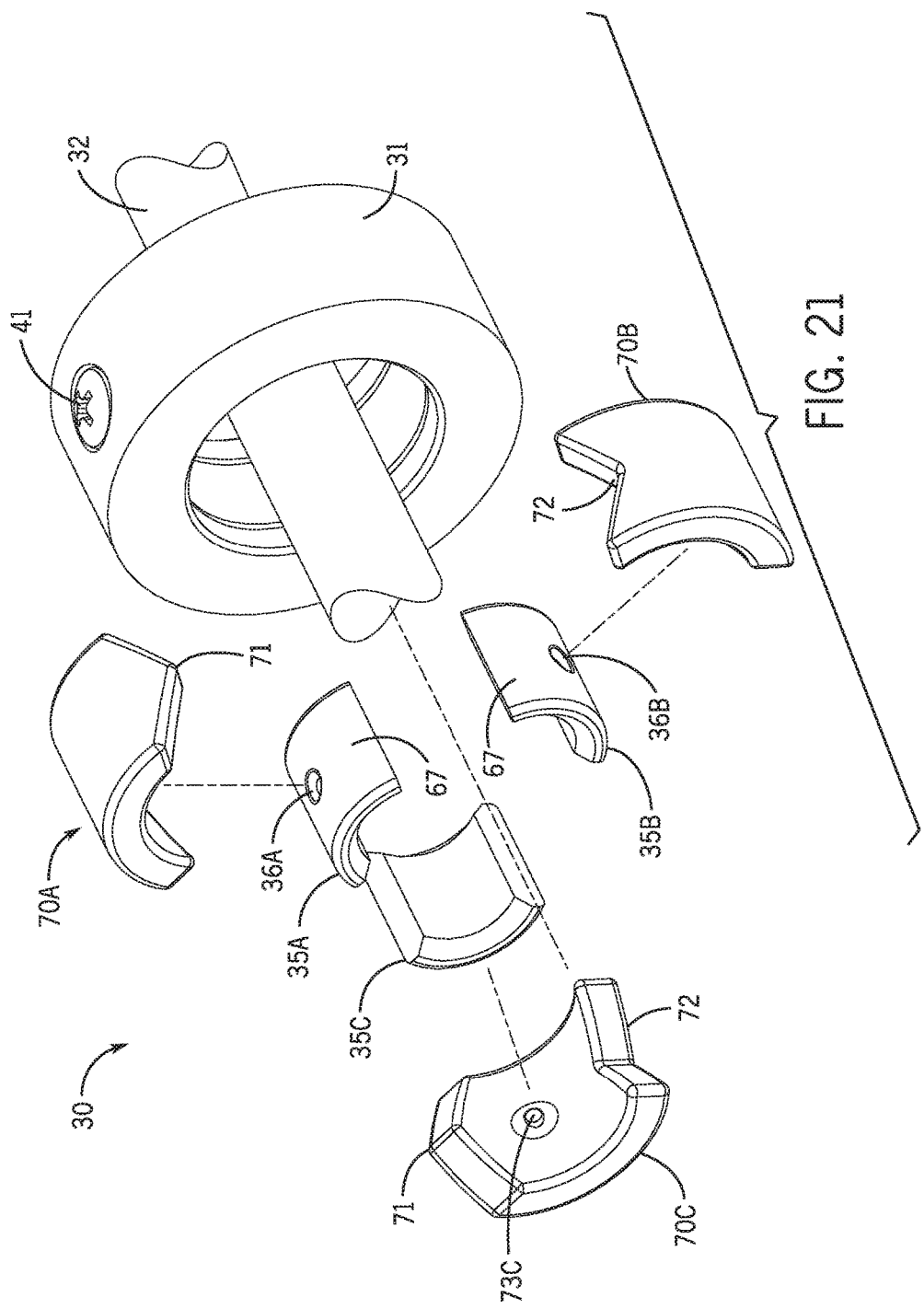
FIG. 21 is an exploded perspective view of another exemplary Self-Adjusting Bushing Bearing similar to the device shown in FIG. 14, but shown with the biasing element as three cylindrical segments.

FIGS. 21-23 show another exemplary embodiment of an SABB 30 wherein the springy element is a cylindrical body, but wherein the cylindrical body is further made up of cylinder segments 70A, 70B, 70C that nest with each other to together form a cylinder shape. As shown in FIG. 21, each cylinder segment 70A, 70B, 70C has a male end 71 and a female end 72 that is opposite of the male end 71. One advantage of this embodiment is that the cylinder segments 70A, 70B, 70C can be installed or replaced without removing the bearing segments 35A, 35B, 35C or the shaft 32 from the bearing subassembly 33. It should be recognized that different materials may also be used for the cylinder segments 70A, 70B, 70C, as with other the other cylindrical body springy elements, based on requirements of the bearing application.

Figure 24:
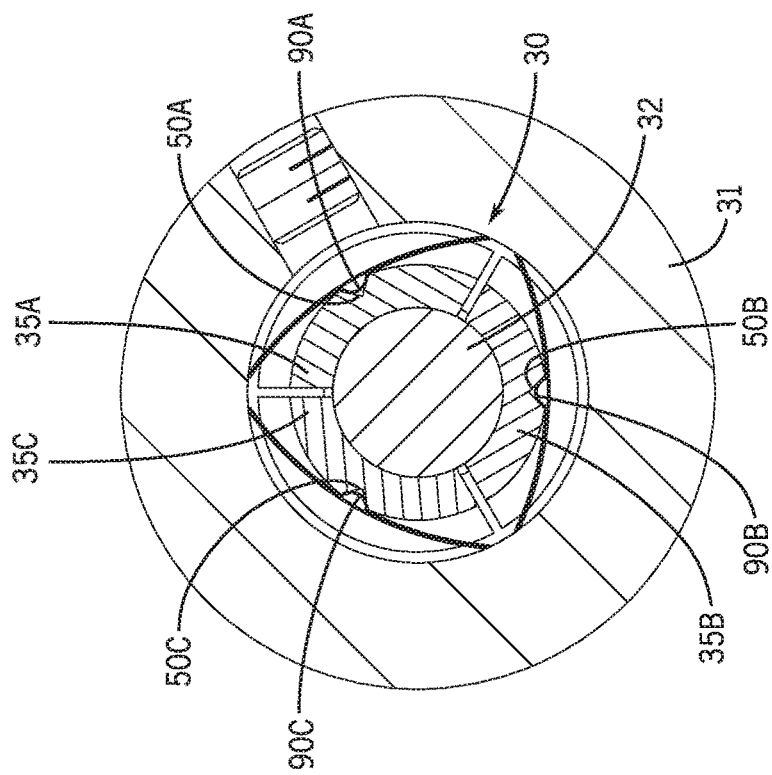
FIG. 24 is an end view of another exemplary Self-Adjusting Bushing Bearing similar to the device shown in FIG. 1, but having additional leaf springs stacked together.

In certain embodiments, a secondary springy element 90 is used in addition to the primary springy element 50 to together bias a bearing segment 35A, 35B, 35C radially inwardly towards the shaft 32. FIG. 24 shows an SABB 30 like the SABB shown in FIG. 1, but including a secondary leaf spring 90A, 90B, 90C as the secondary springy element 90, stacked on top of the leaf spring 50A, 50B, 50C as the primary springy element 50. The secondary leaf spring 90A, 90B, 90C may be added to the leaf spring 50A, 50B, 50C to provide a greater combined biasing force, or to change the spring characteristics depending on the radial displacement of the shaft 32 relative to the housing 31.

The secondary springy element 90 and primary springy element 50 may have different spring rates or structural make-ups. Furthermore, the secondary springy element 90 and primary springy element 50 may provide biasing forces on the bearing segments 35A, 35B, 35C at different instances, or may provide different biasing forces depending on radial displacement of the shaft 32 relative to the housing 31. For example, the primary springy element 50 may create a radially inward force on the bearing segment 35A, 35B, 35C with no radial defection of the shaft 32 relative to the housing 31, wherein the secondary springy element 90 becomes engaged to create radially inward force on the bearing segment 35A, 35B, 35C only when this radial displacement reaches a specified threshold.

FIG. 25 shows an SABB 30 like the SABB 30 shown in FIG. 8, but wherein the radial stop 65 in FIG. 8 has been replaced with a secondary circumferential retainer 92 surrounding the bearing subassembly 33. In this example, the secondary circumferential retainer 92 has a projection 63A, 63B, 63C to mate with the recess 36A, 36B, 36C in each bearing segment 35A, 35B, 35C in the same manner as the projections 63A, 63B, 63C in the opposing end caps 60 as discussed above. The localized engagement of the secondary circumferential retainer 92, as with the localized engagement of the springy element 50, provides the added benefit of helping to maintain equal spacing between bearing segments 35A, 35B, 35C. This allows each bearing segment 35A, 35B, 35C to independently adjust its orientation relative to the shaft 32 to allow a lubricant 42 to develop an optimum hydrodynamic boundary layer based on the applied loads and rpm.

Alternatively, the secondary circumferential retainer 92 may be used in conjunction with a radial stop (such as 65 in FIG. 8), or with an additional secondary circumferential retainer 92 (not shown) added. Similarly, any of the secondary circumferential retainers 92 may be formed without a projection, for instance, if the radial stop 65 already has a projection to perform the localized engagement with bearing segments 35A, 35B, 35C. Similarly, the secondary circumferential retainer 92 may not require a projection 63A, 63B, 63C, for example, if the primary springy element 50 already mates with the bearing segment 35A, 35B, 35C in a manner discussed above. For example, a secondary circumferential retainer 92 may be placed on each side of the leaf springs 50A, 50B, 50C.

It should be recognized that for each embodiment, the projections and recesses could also be reversed. For example, in the embodiment shown in FIG. 25, projections could radially extend outwardly along the outer surface 67 of each bearing segment 35A, 35B, 35C to mate with recesses that radially extend inwardly from the inner radial surface 62 of each of the opposing end caps 60. Likewise, these projections on bearing segments 35A, 35B, 36C could mate with recesses inside the radial stop 65.

The inventors have recognized that in certain examples, combining the function of the radial stop 65 and the secondary circumferential retainer 92 such that the radial stop 65 mates with the bearing segments 35A, 35B, 35C or the secondary circumferential retainer 92 advantageously limits the radial displacement of the bearing segments 35A, 35B, 35C relative to the housing 31. In these configurations, rigid non-springy elements accurately control the spacing between the bearing segments 35A, 35B, 35C, accurately control the maximum radial displacement of the bearing segments 35A, 35B, 35C relative to the housing 31, and accurately control the ability of the individual bearing segments 35A, 35B, 35C to adjust relative to the shaft 32 to optimize the creation of the hydrodynamic lubrication boundary layer, while the springy element continuously maintains the intimate engagement of all bearing segments 35A, 35B, 35C with the shaft 32. Where the springy element is elastomeric, the springy element may also form the base a shaft seal as disclosed in U.S. Provisional Patent Application No. 62/258,695.

Figure 26:
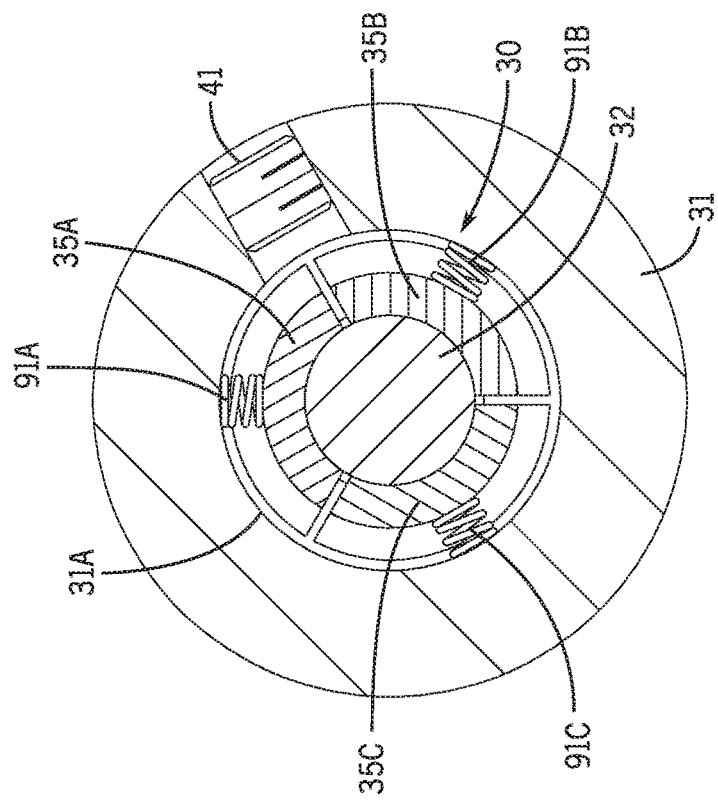
FIG. 26 is an end view of another exemplary Self-Adjusting Bushing Bearing similar to the device shown in FIG. 1, but replacing the leaf springs with coil springs.

FIG. 26 shows an SABB 30 like the SABB shown in FIG. 1, but wherein instead of leaf springs 50A, 50B, 50C, the springy element 50 includes coil springs 91A, 91B, 91C. The coil springs 91A, 91B, 91C are compressed between a bearing segment 35A, 35B, 35C and the inner periphery 31A of the housing 31 to bias each bearing segment 35A, 35B, 35C radially inwardly toward the shaft 32. Alternatively, the coil springs 91A, 91B, 91C could be used in conjunction with another coil spring 91A, 91B, 91C, a leaf spring 50A, 50B, 50C, the opposing end caps 60, a cylindrical body 80, or another similar springy element.

It should be noted that while FIGS. 1-26 show a shaft 32 extending through the SABB 30 and housing 31, the present concepts are also applicable to situations wherein the SABB 30 and bearing subassembly 33 receive the end of a shaft 32, which can be cylindrical or the spherical part of a ball joint as shown in U.S. Pat. No. 8,870,459.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A self-adjusting bushing bearing comprising:
   a bearing subassembly that is configured to be received in a housing, the bearing subassembly comprising a plurality of bearing segments that together are configured to receive a shaft therein; and
   a springy element that biases the plurality of bearing segments radially inwardly towards the shaft;
   wherein the springy element comprises a body having a first end and a second end that is opposite the first end, wherein the springy element comprises a projection located between the first and second ends, wherein at least one bearing segment in the plurality of bearing segments comprises a recess that receives the projection to mate the springy element with the at least one bearing segment in the plurality of bearing segments.

2. The self-adjusting bushing bearing of claim 1, wherein the springy element and the plurality of bearing segments mate with each other by male-female connections.

3. The self-adjusting bushing bearing of claim 1, wherein the springy element comprises a plurality of projections that mate with the plurality of bearing segments.

4. The self-adjusting bushing bearing of claim 3, wherein the plurality of bearing segments forms a plurality of recesses that receives the plurality of projections.

5. The self-adjusting bushing bearing of claim 1, wherein the springy element biases each bearing segment in the plurality of bearing segments radially inwardly towards the shaft.

6. The self-adjusting bushing bearing of claim 1, wherein the springy element is configured to abut against an inner periphery of the housing.

7. The self-adjusting bushing bearing of claim 1, wherein the springy element comprises a first leaf spring.

8. The self-adjusting bushing bearing of claim 7, wherein the first leaf spring comprises a projection that mates with a first bearing segment in the plurality of bearing segments.

9. The self-adjusting bushing bearing of claim 8, wherein the first bearing segment comprises a recess that receives the projection of the first leaf spring.

10. The self-adjusting bushing bearing of claim 7, wherein the first leaf spring is one of a plurality of leaf springs.

11. A self-adjusting bushing bearing comprising:
a bearing subassembly that is configured to be received in a housing, the bearing subassembly comprising a plurality of bearing segments that together are configured to receive a shaft therein; and
a springy element that biases the plurality of bearing segments radially inwardly towards the shaft;
wherein the springy element is mated with at least one bearing segment in the plurality of bearing segments;
wherein the springy element comprises a first leaf spring;
wherein the first leaf spring comprises a projection that mates with a first bearing segment in the plurality of bearing segments;
wherein the first bearing segment comprises a recess that receives the projection of the first leaf spring; and
wherein the first leaf spring comprises a body having a first end and a second end that is opposite the first end, wherein the projection of the first leaf spring is located between the first and second ends.

12. The self-adjusting bushing bearing of claim 11, wherein the first end and the second end of the first leaf spring are configured to abut against an inner periphery of the housing such that the body is deflected radially inwardly and applies a radially inward force that biases the first bearing segment radially inwardly towards the shaft.

13. A self-adjusting bushing bearing comprising:
a bearing subassembly comprising a plurality of bearing segments that together are configured to receive a shaft therein;
a housing having an inner periphery, the housing receiving the bearing subassembly within the inner periphery; and
leaf spring having a body with a first end and a second end that is opposite the first end, the leaf spring having a projection located between the first end and the second end, wherein the leaf spring is disposed at least partially between the housing and a first bearing segment of the plurality of bearing segments;
wherein the first bearing segment has a recess, the recess of the first bearing segment being configured to receive the projection of the leaf spring to mate the first bearing segment with the leaf spring; and
wherein the first end and the second end of the first leaf spring are configured to abut against the inner periphery of the housing such that the body is deflected radially inwardly and applies a radially inward force that biases the first bearing segment radially inwardly towards the shaft.

\* \* \* \* \*

UNITED STATES PATENT AND TRADEMARK OFFICE
CERTIFICATE OF CORRECTION

PATENT NO. : 9,790,988 B1  
APPLICATION NO. : 14/961368  
DATED : October 17, 2017  
INVENTOR(S) : Douglas A. Larson Page 1 of 1

It is certified that error appears in the above-identified patent and that said Letters Patent is hereby corrected as shown below:

In the Claims

In Claim 13, Column 10, Line 8: insert --a-- before the word "leaf".

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*